Jan. 31, 1956 W. D. JOHNSON 2,732,605
APPARATUS FOR FORMING STONE BUILDING SLABS
Filed May 2, 1952 2 Sheets-Sheet 1
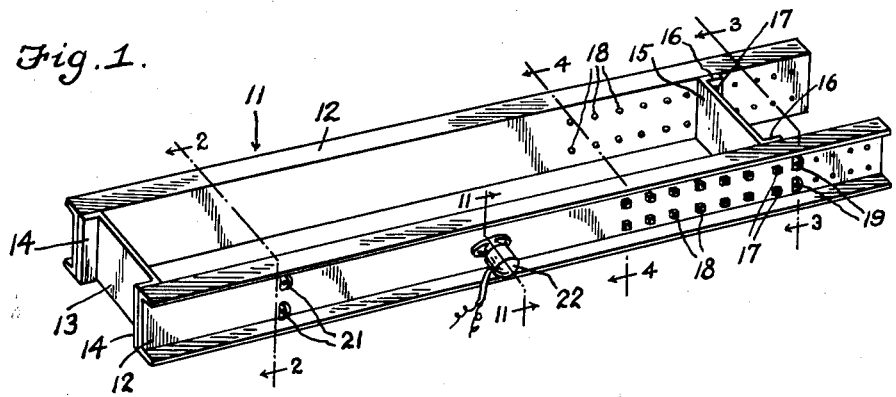
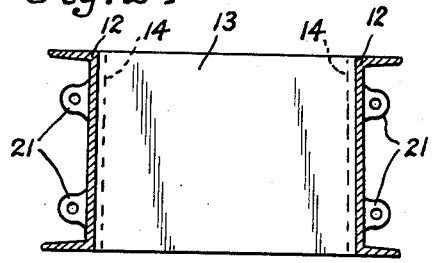
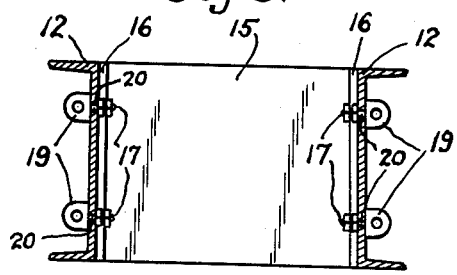
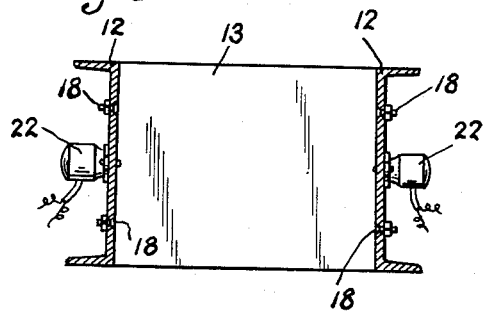
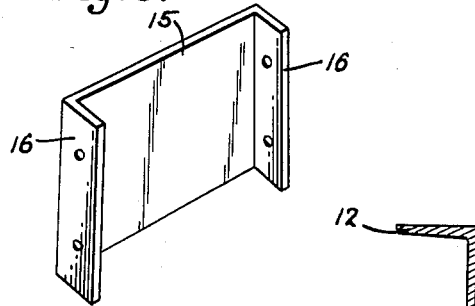
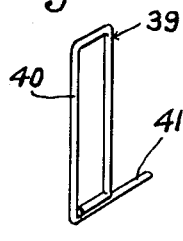
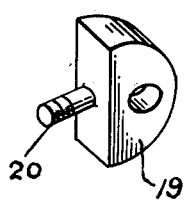
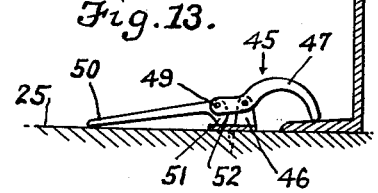
INVENTOR.
William D. Johnson
BY
McMorrow, Berman + Davidson
Attorneys.

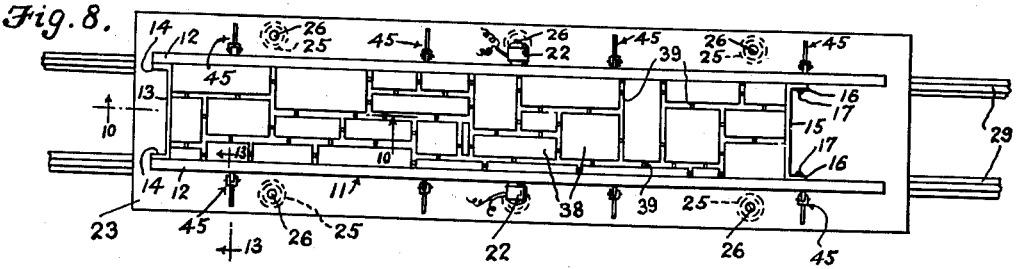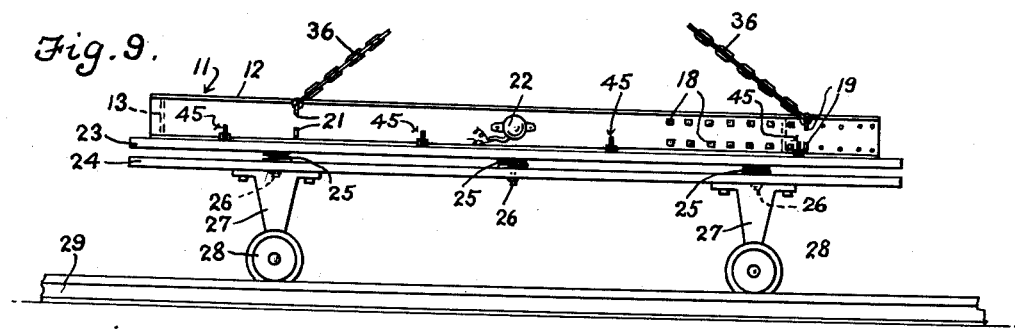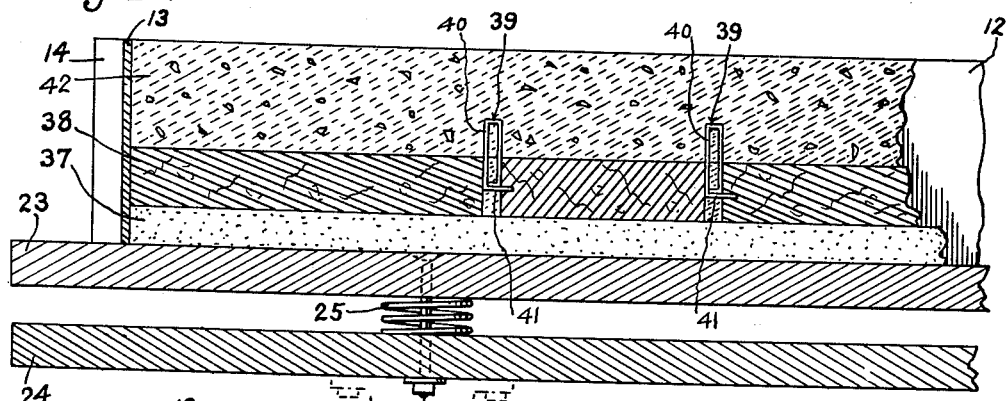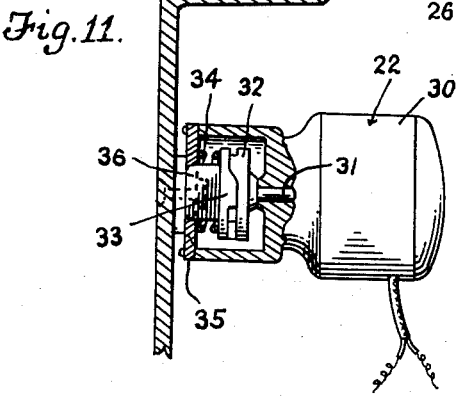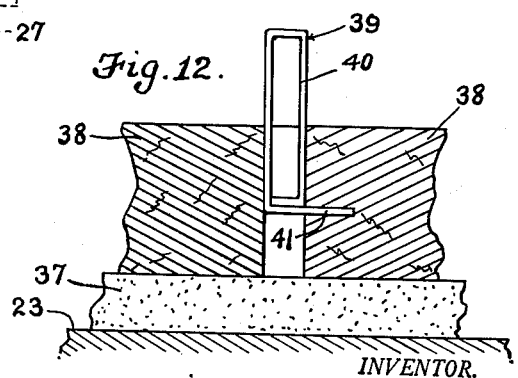
INVENTOR.
William D. Johnson

United States Patent Office 2,732,605
Patented Jan. 31, 1956

2,732,605

APPARATUS FOR FORMING STONE BUILDING SLABS

William D. Johnson, Austin, Tex.

Application May 2, 1952, Serial No. 285,729

1 Claim. (Cl. 25—121)

This invention relates to the molding of building slabs, and more particularly to an improved apparatus for forming stone building slabs.

The main object of the invention is to provide a novel and improved apparatus for forming building slabs of the type comprising a plurality of stones bonded together by a cement or concrete main body, the improved apparatus enabling composite building stones of the above type to be rapidly and economically formed, the apparatus involved being simple in construction, being easy to set up, and being readily adjustable to provide a desired length of slab.

A further object of the invention is to provide an improved apparatus for casting a building slab of the type comprising a plurality of flat stones bonded together by a cement or concrete body, the improved apparatus involving inexpensive components, being easy to manipulate, and providing a uniform distribution of the cement or concrete binder.

Further objects and advantages of the invention will become apparent from the following description and claim, and from the accompanying drawings, wherein:

Figure 1 is an isometric view of a mold or form employed to fabricate an improved building slab according to the present invention.

Figure 2 is an enlarged transverse vertical cross sectional view taken on the line 2—2 of Figure 1.

Figure 3 is an enlarged transverse vertical cross sectional view taken on the line 3—3 of Figure 1.

Figure 4 is an enlarged transverse vertical cross sectional view taken on the line 4—4 of Figure 1.

Figure 5 is an isometric view of the adjustable flanged end plate employed in the mold of Figure 1.

Figure 6 is an enlarged isometric view of one of the detachable apertured lugs employed at one end of the mold of Figure 1.

Figure 7 is an enlarged isometric view of one of the bonding clips employed in forming an improved building block according to the present invention.

Figure 8 is a top plan view showing the mold of Figure 1 disposed on its supporting means with the stones required to form a building slab positioned in the form preparatory to pouring the cement or concrete body thereover.

Figure 9 is a side elevational view of the structure shown in Figure 8.

Figure 10 is an enlarged vertical cross sectional view taken on the line 10—10 of Figure 8.

Figure 11 is an enlarged vertical cross sectional detail view taken on the line 11—11 of Figure 1.

Figure 12 is an enlarged cross sectional detail view showing the method of mounting one of the bonding clips of Figure 7 between a pair of flat stones in a position to be embedded by the cement or concrete body to be poured over the stones during the process of fabrication of a building slab according to the present invention.

Figure 13 is an enlarged transverse vertical cross sectional view taken on the line 13—13 of Figure 8.

Referring to the drawings, and more particularly to Figures 1 through 5, 11 generally designates a block molding form employed in carrying out the method of the present invention, said molding form comprising a pair of parallel, longitudinally extending, outwardly facing channel bars, 12, 12 rigidly connected at one end by a vertical transverse plate member 13, said plate member being formed at its ends with the flanges 14, 14 which are respectively welded to the inside surfaces of the end portions of the channel bars 12, 12, as shown in Figure 1. Designated at 15 is a second transverse vertical plate member formed with the flanges 16, 16, said flanges being secured to the inside surfaces of the channel bars 12, 12 adjacent the ends of the channel bars opposite the plate member 13, as by the respective pairs of vertically spaced bolts 17, 17 extending through each flange 16 and through vertically spaced apertures provided in the web portions of the channel bars 12, 12. As shown in Figure 1, a plurality of sets of vertically spaced apertures may be provided, said sets being spaced longitudinally along the channel bars, the unused apertures being filled by removable bolts 18 inwardly of the plate member 15 to prevent leakage of the plastic binder material during the process of forming a building slab.

Designated at 19, 19 are respective apertured lug members, each lug member being formed with a shank 20 engaged through the web portion of a channel bar 12, a pair of apertured lugs 19, 19 being provided on each channel bar, the lugs being secured by suitable nuts threadedly engaged on the inner portions of the shank elements 20 of the lugs. The apertured lugs 19 may be secured in any selected pair of the apertures intended to receive the bolts 17, preferably a pair of apertures located outwardly adjacent the adjustable end plate 15. Designated at 21, 21 are a pair of apertured lugs rigidly and fixedly secured to the web portion of each channel bar 12 adjacent the opposite end of the form, as shown in Figure 1.

Designated respectively at 22, 22 are electric vibrators of conventional construction which are secured to the intermediate portions of the webs of the channel bars 12, 12, one electric vibrator 22 being provided on each side of the form, as shown in Figure 4.

The form 11 is supported on a flat body 23, which in turn is supported on a platform 24, the supporting body 23 being resiliently supported on the platform 24 by the interposition of a plurality of cushioning springs 25 surrounding fastening bolts 26 connecting the body 23 to the platform 24.

The platform 24 is provided with the wheel brackets 27 having journaled thereto the wheels 28 which are engaged on tracks 29 so that the platform 24 may be moved along the tracks 29 during the fabrication of the building blocks and so that the platform 24 may be moved with the finished building blocks after said building blocks have been formed to a suitable curing station.

As shown in Figure 11, the electric vibrators 22 may each comprise a driving motor 30 having a shaft 31 to which is secured a cam disc 32 which reciprocates a mating cam disc 33 biased into engagement with the cam disc 32 by a coiled spring 34 acting between the disc 33 and the end wall 35 of the vibrator housing. Energization of the motor 30 therefore produces periodic vibration of the driven disc 33 and its vibratory element 36, shown in Figure 11, whereby vibrations are transmitted to the web of the associated channel bar 12.

In forming a slab, the form 11 is first deposited on the body 23, the form being supported by chains 36, 36 depending from a suitable hoist or winch. After the form 11 is disposed on the body 23, a layer of sand 37 is deposited in the bottom of the form, and then a plurality of flat stones 38 are laid on the sand layer 37, each flat stone having secured thereto a bonding clip 39, as shown in Figures 10 and 12. Each bonding clip 39 comprises an upstanding main loop portion 40 terminating in a laterally projecting bottom finger 41 which is secured in a recess drilled in the edge of one of the stones 38. As shown in Figures 10 and 11, the upstanding rectangular loop portions 40 serve as spacer means for spacing adjacent stones 38, and the upstanding loop portions project a substantial distance above the top surfaces of the stones. After the stones have been disposed in the form in any desired pattern, such as, for example the pattern shown in Figure 8, a layer of concrete 42 consisting of a suitable agglomeration of cement and suitable aggregate is poured over the stones 38 to fill the form 11. The vibrators 22 are then energized to provide uniform distribution of the aggregate through the cement. It will be noted that the top portions of the spacer clips 39 are embedded in the cement and serve to bond the stones 38 to the cement as well as to space the stones. After the mixture of cement and aggregate has set to a substantial degree of hardness, the form 11 is lifted from the block and the block is conveyed along the tracks 29 to a suitable curing station for final curing of the block.

The blocks may be poured in suitable lengths, the lengths of the blocks being adjusted by changing the position of the end plate 15 of the form in the manner above described.

As shown in Figure 13, each channel bar 12 may be releasably held down on the body 23 by means of a plurality of clamp members 45 secured to the body 23 along the bottom flanges of the channel bars and arranged for engagement with said bottom flanges in the manner shown in Figure 13. Each clamping member 45 comprises an upstanding apertured lug 46 to which is pivoted a clamping lever 47 having an outwardly extending arm 48. Pivoted at 49 to the end of each arm 48 is a handle 50 having a depending cam portion 51 which is engageable with the bottom plate 52 of the clamping device 45, said bottom plate 52 being secured to the supporting body 23 and carrying the upstanding apertured lug 46. As shown in Figure 13, by rotating the handle 50 downwardly to the position shown in Figure 13, the lever 47 is urged into clamping engagement with the bottom flange of the adjacent channel bar 12 to tightly clamp the channel bar to the supporting body 25. To release the channel bar it is merely necessary to elevate the handle 50, whereby the clamping lever 47 is rotated counterclockwise, as viewed in Figure 13, releasing the adjacent channel bar 12.

While a specific method and means for forming composite blocks have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A block molding apparatus including a form comprising a pair of parallel, elongated, outwardly facing longitudinal channel bar members, a first transverse vertical plate member rigidly secured to the ends of the longitudinal channel bar members at one end of the form, a second transverse vertical plate member, respective flanges on the vertical ends of the second plate member, said flanges being perpendicular to said second plate member and being engageable in face to face relation with the inside surfaces of the longitudinal channel bar members, respective fastening members detachably securing said flanges to the webs of the channel bar members, said second plate member being located adjacent the other end of the form, respective horizontally active electric vibrators secured to the intermediate portions of the webs of the longitudinal channel bar members in transverse alignment with each other, a flat supporting body underlying said form, clamp means on said body engageable with the flanges of said channel members, a platform beneath said body, a plurality of pairs of wheels supporting said platform, and spring means supporting said body on said platform.

References Cited in the file of this patent

UNITED STATES PATENTS

| Number | Name | Date |
|---|---|---|
| 273,606 | Reid | Mar 6, 1883 |
| 783,442 | Lawrence | Feb. 28, 1905 |
| 824,235 | Damon | June 26, 1906 |
| 1,000,089 | Haas | Aug. 8, 1911 |
| 1,004,327 | Williams | Sept. 26, 1911 |
| 1,574,985 | McWain | Mar. 2, 1926 |
| 1,700,156 | Copeman | Jan. 29, 1929 |
| 1,707,994 | Romie | Apr. 9, 1929 |
| 2,342,440 | Whitsitt | Feb. 22, 1944 |
| 2,512,117 | Sims | June 20, 1950 |
| 2,535,389 | Canfield | Dec. 26, 1950 |
| 2,583,104 | Jentsch | Jan. 22, 1952 |
| 2,595,066 | Ferrin | Apr. 29, 1952 |